United States Patent [19]
Lubbers et al.

[11] 3,929,605
[45] Dec. 30, 1975

[54] APPARATUS FOR QUICKLY EVALUATING GASES DISSOLVED IN BLOOD

[75] Inventors: Dietrich W. Lübbers, Dortmund; Albert Huch, Marbach,Marburg, both of Germany

[73] Assignee: Eschweiler & Co., Kiel, Germany

[22] Filed: Sept. 23, 1974

[21] Appl. No.: 508,633

[30] Foreign Application Priority Data

Sept. 22, 1973 Germany.............................. 2255879

[52] U.S. Cl............................................ 204/195 P
[51] Int. Cl.².......................................... G01N 27/46
[58] Field of Search............. 204/195 P, 195 B, 1 T; 128/2 E

[56] References Cited
UNITED STATES PATENTS 3,795,239   3/1974   Eberhard et al. ................... 128/2 E

*Primary Examiner*—G. L. Kaplan
*Attorney, Agent, or Firm*—Robert M. Vargo; Alan C. Rose

[57] ABSTRACT

A sensing apparatus is disclosed for measuring the concentration of gas in a blood sample. The sensor includes a temperature measuring surface centrally enclosing a sensor head for measuring the indicator concentration. The temperature measuring surface has a low heat capacity and is electrically heated to a constant temperature by means of an electrical control device. A ring of a material having good heat conductivity is provided to form a measuring tray having a close heat contact with the temperature measuring surface. The measuring tray is in the form of a reservoir for the blood. The bottom of the reservoir is positioned adjacent the sensor head being separated only by a gas permeable membrane.

9 Claims, 1 Drawing Figure

U.S. Patent   Dec. 30, 1975   3,929,605
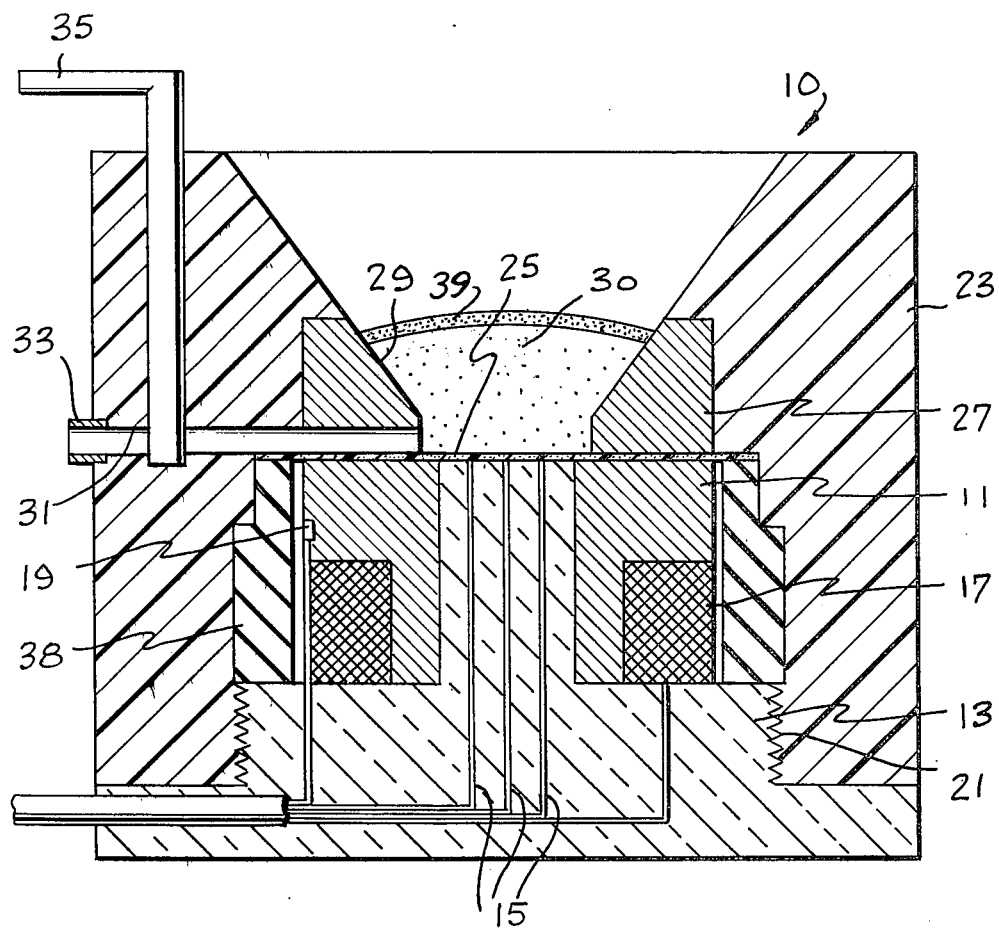

APPARATUS FOR QUICKLY EVALUATING GASES DISSOLVED IN BLOOD

BACKGROUND OF THE INVENTION

1. Field of the Invention

The present invention relates generally to apparatus for determining the perfusion efficiency factor of skin tissue, and more particularly to apparatus for measuring the indicator concentrations in blood samples.

2. Description of the Prior Art

The term "perfusion efficiency" as used in the present disclosure is intended to designate a physiological value which is determined by the degree of perfusion and the local concentration of the substance supplied to a given locus by the perfusion. The degree of perfusion, in the case of organs, is the blood circulation measured in ml per unit of weight per unit of time. The local concentration of supplied substance is called the indicator concentration.

A high efficiency of perfusion is obtained if the indicator substance is distributed in the organ by a low perfusion so that its concentration corresponds to the existing physiological requirements.

In applicant's co-pending U.S. patent application, Ser. No. 414,538, now abandoned, a sensor is described which is capable of accurately measuring this efficiency factor. This measurement is accomplished by a sensor which percutaneously determines the perfusion efficiency by simultaneously measuring the perfusion and the concentration of the indicator at the same locus of the skin. The sensor includes an indicator concentration measuring device, centrally surrounded by a temperature measuring surface. This surface is electrically heated to a constant temperature by a temperature control device. In the combination, means are also provided for measuring the power consumption.

Although the device described in applicant's co-pending application operates quite accurately under normal circumstances, it has been found that some measuring problems occur in some situations. One such instance where the perfusion is strongly hampered is when a person is in the state of shock. At that time a reliable determination of the blood gas is not possible. Another instance is where the calibration measurements occur in surroundings where the pressure is above atmospheric. Therefore, where tests are necessary in high pressure cabins, applicant's prior device could not carry out the measuring method in a sufficiently quick manner. Moreover, it has been found that measurements at the venous side of the blood circulation are not possible with prior devices.

SUMMARY OF THE INVENTION

The present invention obviates the above-mentioned shortcomings by providing a measuring device that is capable of determining the content of blood gas with very small quantities of blood.

In its broadest aspect, the present invention relates to a sensor having a temperature measuring element centrally enclosing a sensor head for measuring the indicator concentration. The temperature measuring surface has a low heat capacity and is electrically heated to a constant temperature by means of an electrical control device. A membrane is positioned adjacent the sensing head and is permeable to the gas of a blood sample while being nonpermeable to the liquid of the blood sample. A ring consisting of a material having good heat conductivity is provided to form a measuring tray having a close heat contact with the temperature measuring surface. The ring forms a reservoir for receiving a quantity of blood. The reservoir is formed by a conical bore extending through the ring element with the bottom of the reservoir being formed by the membrane extending across the opening of the bore. The reservoir has an inside diameter equal to its height and is capable of receiving a blood sample.

A primary advantage of the present invention is that the sensor is extremely accurate while utilizing small quantities of blood samples, such as two drops. The main reason for this is that on the one hand, the internal consumption of the blood gas by the measuring procedure is kept very small by the use of very fine electrodes. On the other hand, the quantity of blood forms a sufficiently large reservoir for the gas and can produce a sufficiently large heat insulating and protection layer against the air in connection with the regulation of the temperature. By keeping the temperature constant, the blood sample lying in the sensor tray maintains the same qualities as the interior of the body.

The features of the present invention, which are believed to be novel, are set forth with particularity in the appended claims. The present invention, both as to its organization and manner of operation, together with the further advantages thereof, may best be understood by reference to the following description taken in connection with the accompanying drawings.

BRIEF DESCRIPTION OF THE DRAWING

The FIGURE is a sectional view of the sensing apparatus in accordance with the present invention.

DETAILED DESCRIPTION OF THE PREFERRED EMBODIMENT

Referring now to the drawing, the FIGURE illustrates a sensing apparatus, generally indicated by arrow 10, which includes a temperature measuring element 11 made of silver and covered with a layer of silver chloride. The temperature measuring element 11 serves as a polarographic anode and concentrically encloses a glass body 13 containing a plurality of electrodes 15. A heating coil 17 encloses the measuring element 11 to heat the element 11 to a constant measuring temperature, for example 40°C. The temperature is kept constant by means of a temperature detector or electric thermometer 19, which in turn is controlled by an electronic control device (not shown). A locking screw 21 is integrally connected to the measuring element 11 and is adapted to be threaded into a concentric hole of an outer member 23.

The outer member 23 preferably consists of Plexiglass with the upper interior thereof receiving a ring 27. The ring 27 is preferably made of a material having good heat conductivity, and includes a conical bore 29 forming a funnel-shaped measuring tray, which functions as a reservoir for a sample of blood 30.

A thin Teflon membrane 25 is positioned below the ring 27 and forms the bottom surface of the reservoir. An important feature of the present invention is that the Teflon member 25 is permeable for the oxygen diffusing from the blood 30 to the electrodes 15 while still being nonpermeable to the liquid blood to separate the liquid from the electrodes 15. An annular seal 38 is adapted to sealingly engage the outer periphery of the membrane 25 and is biased in the sealed position by the locking screw 21.

A bore hole 31 is provided to extend through the ring 27 and the member 23 to be utilized as a drain connection to a suction pump (not shown) by means of a connecting nipple 33. A valve 35 is provided to open and close the bore 31.

An advantage of the suction funnel 31 with the closeable valve 35 is that the handling of the device is simplified. As a result, the device can be cleaned and kept ready for use very quickly so that in spite of the discontinuity of the measurement, rapid sequences of measurements can be achieved.

Another important development of the invention is that the gas permeable membrane 25 is easily removable by removing the locking screw 21 and element 11. This improved construction has the advantage that a defective membrane can be exchanged in a simple and rapid manner and that the sensor can be maintained in readiness without special provisions.

The conical bore 29 functions to receive the blood sample 30 usually equivalent of 30–50 $\mu$l (equal to about 2 drops of blood). In the blood sample 30, a layer 39 is formed at the top surface thereof. This layer 39 having a concentration of gas is changed by the influence of the atmosphere. However, this layer 39 shields and protects that part of the blood which lies in contact with the measuring electrodes 15 so that blood used for the measuring procedure, owing to the constant temperature of the rings 27 and 11 is kept in the same quality as the blood vessels. It should be noted at this time that the inside diameter of the bore hole 29 is approximately equal to the height of the ring 27. By this dimension, the proportion between the blood used for the determination and the blood acting as an outward shield 39 can be kept optimally maintained. Since the consumption of blood gas by the measuring procedure is very small, and since the Teflon membrane 25 is very thin, it is possible by means of the sensor of the present invention to execute measurements of blood gas concentration very rapidly and accurately. After a measuring procedure is terminated, the drop lying on the sensor can be removed by the suction pump after the valve 35 is opened, and the device can be cleaned in a very simple manner.

It should be noted that various modifications can be made to the assembly while still remaining within the purview of the following claims.

What is claimed is:

1. A sensing apparatus for measuring the concentration of gas in a blood sample comprising:
   a temperature measuring element having a heater thermally connected thereto and responsive to control means for sensing the temperature of said temperature measuring element and maintaining the same at a constant temperature,
   an electrolytic sensing head, located within said temperature measuring element, having means for measuring the concentration of gas in the blood sample;
   a membrane positioned adjacent said sensing head, said membrane being permeable to the gas of the blood sample and nonpermeable to the liquid of the blood sample;
   a ring element made of a heat conductive material positioned adjacent said temperature measuring element and thermally coupled thereto, said ring element forming a reservoir for receiving a quantity of blood, said reservoir being formed by a conical bore extending through the ring element with the bottom of the reservoir being formed by the membrane extending across the opening of the bore, said reservoir having an inside diameter equal to its height, and capable of receiving a blood sample volume of 30 to 50 $\mu$l.

2. The combination of claim 1 wherein said ring member includes a suction channel communicating with said reservoir.

3. The combination of claim 2 wherein said suction channel includes a closeable valve.

4. The combination of claim 1 further including an outer element enclosing said ring element.

5. The combination of claim 4 further including a locking screw integrally connected to temperature sensing element and said sensing head.

6. The combination of claim 5 wherein said locking screw includes means for connecting said locking screw to said outer element.

7. The combination of claim 6 wherein said membrane is located between said temperature measuring element and said ring element.

8. The combination of claim 7 wherein said membrane is locked in position by a seal ring biasing said membrane against said outer member.

9. The combination of claim 1 wherein said temperature measuring element is made of silver covered with a layer of silver chloride.

* * * * *